Dec. 23, 1941. J. E. TONKIN 2,267,628
THERMOSTATIC CONTROL AIR REGULATOR FOR INTERNAL COMBUSTION ENGINES
Filed April 28, 1941
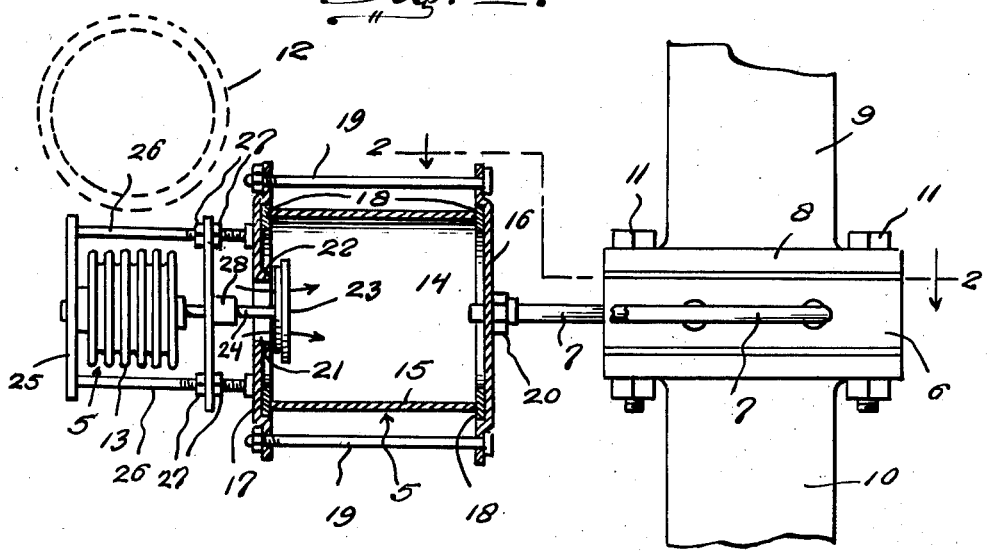
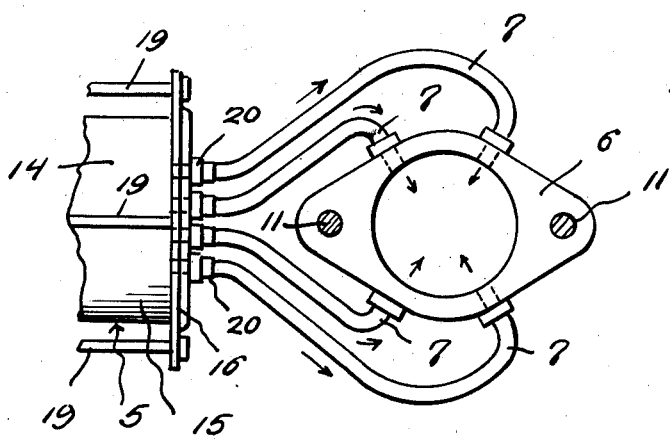
Inventor
James E. Tonkin,
By McMorrow & Berman
Attorneys Patented Dec. 23, 1941

2,267,628

UNITED STATES PATENT OFFICE 2,267,628

THERMOSTATIC CONTROL AIR REGULATOR FOR INTERNAL COMBUSTION ENGINES

James E. Tonkin, Sutton, W. Va.

Application April 28, 1941, Serial No. 390,856

2 Claims. (Cl. 48—180)

This invention relates to an auxiliary air supply for internal combustion engines using a volatile fuel, such as gasoline, and has for the primary object the provision of a device of this character which is in the form of an attachment to permit its easy and quick application to an intake manifold of an engine for admitting air thereto for the purpose of conserving fuel and also for providing better engine performance as to amount of power, acceleration and smoothness of operation.

Another object of this invention is the provision of a device of the above stated character which will automatically admit preheated air to the intake manifold in such a way that the preheated air will tend to mix the engine fuel received from the carbureter and to thoroughly mix therewith prior to reaching the firing chambers of the engine which assures better engine performance and conserving of fuel.

A further object of this invention is the provision of an attachment of the above stated character which includes a thermostatically controlled air admitting means arranged in the vicinity of the exhaust manifold to be heated thereby and to receive heated air thereof and an adapter connected thereto and arranged between the carbureter and the intake manifold, whereby the auxiliary air will be admitted to the engine after a period of operations thereof for mixing the engine fuel therewith only when the engine is in proper condition to receive the auxiliary supply of preheated air, consequently in no way interfering with the starting or running of the engine at the warming up period of said engine.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a side elevation, partly in section, illustrating a thermostatically controlled air regulator constructed in accordance with my invention and showing the same connected to an intake manifold of an internal combustion engine and also associated with the exhaust manifold of the engine.

Figure 2 is a sectional view taken on the line 2—2 of Figure 1.

Referring in detail to the drawing, the numeral 5 indicates a thermostatically controlled air admittance means and 6 an adapter connected to said means 5 by a series of pipes 7.

The adapter 6 is of a shape to match the attaching flanges 8 of an intake manifold 9 and an outlet neck 10 of a carbureter. The usual bolts 11 employed for connecting the intake manifold 9 to the neck 10 are employed for securing the adapter 6 in position between the flanges 8. The pipes 7 have communication with the interior of the adapter at selected places within the internal walls, as clearly shown in Figure 2, so that a series of streams of air may enter the adapter with the streams of air crossing one another and commingling with the fuel mixture received from the carbureter by the intake manifold 9.

The exhaust manifold of the engine is indicated by the character 12 and in installing the present invention it is desirable that the thermostatically controlled air admittance means 5 be arranged adjacent to the exhaust manifold 12 so that the thermostat 13 of said means 5 will be affected by heat from the exhaust pipe or manifold.

The thermostatically controlled air admittance means 5 includes a chamber 14 formed by a cylindrical body 15 and end plates 16 and 17. Suitable gaskets 18 are interposed between the ends of the cylindrical body 15 and the plates 16 and 17, the latter being offset to form seats for the gaskets. To sustain the body and end plates assembled, tie bolts 19 extend through the end plates.

The pipes 7 are connected to the end plate 16, as shown at 20. The plate 17 has an air intake port 21, the walls of which are shaped to form a valve seat 22. A valve 23 coacts with the seat 22 in controlling the admittance of air into the chamber 14. The stem of the valve 23 is indicated by the character 24 and is connected to the thermostat 13. By reference to Figure 1 it will be seen that the thermostat is of the bellows type and is carried by a plate 25 provided with attaching rods 26. The rods are detachably secured to the plate 17 and are provided with screw threaded portions to receive nuts 27. A guide 28 is adjustably mounted on the rods 26 by the nuts 27 and slidably receives the stem 24 to sustain the valve 23 in proper operating relation to the valve seat.

Under normal atmospheric temperature, the thermostat 13 closes the valve 23 so that air will not be admitted to the chamber 14. This is desirable when starting the engine after a period of idleness as the engine in this instance will receive only the fuel mixture delivered by the carbureter. However, when the engine has operated for a period of time sufficient for the exhaust pipe or manifold 12 to throw off heat, the thermostat will be affected by such heat bringing about an unseating of the valve 23. Heated air off of the exhaust pipe may then pass into the chamber 14 due to the suction within the intake manifold. The preheated air entering the chamber 14 passes through the pipes 7 into the adapter 6. The preheated air enters the adapter in a series of streams, which streams of preheated air cross each other as well as the flow of fuel mixture from the carbureter to the intake manifold. This auxiliary supply of preheated air readily commingles with the fuel mixture tending to thoroughly mix the latter prior to reaching the firing chambers of the engine. By admitting the additional supply of air as before stated to the intake manifold will bring about a greater power development by the engine, a faster acceleration of said engine with a smoother operation thereto.

From the foregoing description taken in connection with the accompanying drawing it will be seen that the present invention is extremely simple and economical to construct and may be easily and quickly installed on any type of internal combustion engine due to the use of the adapter. Said adapter further supports the thermostat of the invention in proper relation to the exhaust manifold so as to be affected by the heat thrown off by said exhaust manifold.

Under normal atmospheric temperature, the valve 23 will be held in a seated position by the thermostat which is extremely desirable when starting an engine after a period of idleness. It is a well known fact that an additional supply of air into an intake manifold of an engine when the latter has been idle and cold will render starting of said engine extremely difficult. Thus with the use of the thermostatically controlled valve the starting of the engine with the present attachment applied thereto will assure easy and quick starting of the engine due to the fact that the auxiliary supply of air is cut off at this time. However, as soon as the engine runs under its own power sufficiently long as to become warm, the heat from the exhaust pipe actuated the thermostat and brings about opening of the valve 23 so that the preheated auxiliary supply of air may find its way into the intake manifold and at a time when the engine is acceptable to receive the additional supply of air.

Also the use of this invention on an internal combustion engine in the manner shown and specifically described heretofore will tend to relieve the air pressure about the fuel mixing jets of the carbureter enabling the latter to operate at its highest point of efficiency in the vaporizing and mixing of gaseous fuel with air.

While I have shown and described the preferred embodiment of my invention, it is to be understood that minor changes in construction, combination and arrangement of parts may be made without departing from the spirit and scope of the invention as claimed.

Having thus described the invention, what I claim is:

1. In a thermostatically controlled fluid supply device, an air chamber including a cylindrical body and end plates, means for tying said plates together and in engagement with the ends of said body, one of said plates having an air intake port, a thermostatically controlled valve for said port, a series of pipes connected to the other end plate, and an adapter having said pipes connected thereto.

2. In a thermostatically controlled fluid supply device, an air chamber including a cylindrical body and end plates, gaskets arranged between the end plates and the body, tie bolts connecting said plates, one of said plates having a port, a valve for controlling said port and including a stem, a mounting on one of said plates, a thermostat carried by said mounting and connected to the stem of the valve, a guide adjustably mounted on said mounting and slidably receiving the stem of the valve, and an adapter means connected to the chamber and supporting the thermostat.

JAMES E. TONKIN.